(12) United States Patent
Chen et al.

(10) Patent No.: US 7,443,230 B2
(45) Date of Patent: Oct. 28, 2008

(54) CHARGE PUMP CIRCUIT

(75) Inventors: Chung-Zen Chen, Hsinchu (TW); Chung-Shan Kuo, Taipei County (TW); Yang-Chieh Lin, Tainan (TW)

(73) Assignee: Elite Semiconductor Memory Technology Inc., Hsinchu (TW)

( * ) Notice: Subject to any disclaimer, the term of this patent is extended or adjusted under 35 U.S.C. 154(b) by 100 days.

(21) Appl. No.: 11/463,597

(22) Filed: Aug. 10, 2006

(65) Prior Publication Data

US 2008/0036528 A1    Feb. 14, 2008

(51) Int. Cl.
G05F 1/10 (2006.01)
(52) U.S. Cl. .................. 327/535; 327/538; 327/540
(58) Field of Classification Search ......... 327/535–537, 327/538, 540, 541
See application file for complete search history.

(56) References Cited

U.S. PATENT DOCUMENTS

| | | | | |
|---|---|---|---|---|
| 5,959,854 A | * | 9/1999 | Okada | 363/60 |
| 6,154,411 A | * | 11/2000 | Morishita | 365/226 |
| 6,275,096 B1 | * | 8/2001 | Hsu et al. | 327/535 |
| 6,459,643 B2 | * | 10/2002 | Kondo et al. | 365/226 |
| 6,486,728 B2 | * | 11/2002 | Kleveland | 327/536 |
| 6,567,309 B2 | | 5/2003 | Tanzawa | |
| 6,597,235 B2 | * | 7/2003 | Choi | 327/536 |
| 6,765,428 B2 | * | 7/2004 | Kim et al. | 327/534 |
| 6,816,001 B2 | * | 11/2004 | Soltesz et al. | 327/536 |
| 6,980,045 B1 | * | 12/2005 | Liu | 327/536 |
| 7,274,248 B2 | * | 9/2007 | Okamoto | 327/536 |
| 7,279,961 B2 | * | 10/2007 | Chan et al. | 327/540 |

* cited by examiner

Primary Examiner—Lincoln Donovan
Assistant Examiner—Hai L. Nguyen
(74) Attorney, Agent, or Firm—Jianq Chyun IP Office

(57) ABSTRACT

A charge pump circuit including a plurality of controlled charge pumps (CPs), a plurality of uncontrolled CPs, a plurality of control units, and an output unit is provided. Each controlled CP determines whether to provide charges to a node by a control signal, and each uncontrolled CP constantly provides charges to the node. The higher the node voltage at the node is, the more the controlled CPs not providing charge to the node are, so as to suppress the voltage of the node. In addition, the output unit regulates and outputs an output voltage according to the node voltage by the negative feedback.

7 Claims, 3 Drawing Sheets

CHARGE PUMP CIRCUIT

BACKGROUND OF THE INVENTION

1. Field of the Invention

The present invention relates to a voltage generating circuit. More particularly, the present invention relates to a charge pump circuit, which can be applied to semiconductor memory devices.

2. Description of Related Art

Source voltages of various voltage levels are usually required in electronic devices, thus, charge pump circuits are usually disposed to generate source voltages of different voltage levels from existing source voltages. For example, FIG. 1 illustrates the canonical values of biases required by a memory cell of a flash memory at reading, writing (or programming), and erasing. For the reason of power saving, currently the source voltage supplied to an electronic device is generally 3.3V or lower, thus, obviously, the 5 V, 7 V, 9 V, and 10V in FIG. 1 are to be pulled up by charge pump circuits.

FIG. 2 is a block diagram of a conventional charge pump circuit, which is disclosed in U.S. Pat. No. 6,567,309. Referring to FIG. 2, the charge pump circuit 200 includes a voltage detector 210, a clock generator 220, clock controllers 231~234, and charge pumps 241~244. The voltage detector 210 detects the voltage $V_P$ at node P. Before the voltage $V_P$ reaches a predetermined level (for example, 5V, 7V, 9V, or 10V in FIG. 1), the voltage detector 210 enables the clock generator 220 to generate four phase shift clock signals $CK_1$~$CK_4$, which respectively drive the clock controllers 231~234 and further drive the charge pumps 241~244 to provide charges to node P, so that the voltage $V_P$ is continued to be pulled up. When the voltage $V_P$ has been pulled up to the predetermined voltage level, the voltage detector 210 disables the clock generator 220, so that the charge pumps 241~244 stop providing charges to node P.

In the process described above, the voltage $V_P$ is detected by the voltage detector 210 to determine whether to enable or disable all the charge pumps 241~244, that is, all the charge pumps 241~244 providing charges to node P or none of the charge pumps 241~244 providing charges to node P, and further to accomplish the purpose of adjusting the voltage $V_P$. However, since all the charge pumps 241~244 are enabled or disabled, the voltage $V_P$ drifts about the predetermined voltage to a great extent when the voltage $V_P$ is regulated at the predetermined voltage, and moreover, enabling all the charge pumps 241~244 will consume power considerably.

SUMMARY OF THE INVENTION

Accordingly, the present invention is directed to provide a charge pump circuit having lower power consumption. According to another aspect of the present invention, a charge pump circuit is provided, wherein when the output voltage of the charge pump circuit is pulled up to and regulated at a predetermined voltage, the output voltage drifts about the predetermined voltage to a smaller extent.

According to the aforementioned and other objectives, the present invention provides a charge pump circuit including a plurality of controlled charge pumps (CPs), a plurality of uncontrolled CPs, a plurality of control units, an output unit, and a feedback unit. Wherein, the controlled CPs are determined whether to provide charges to a node by a plurality of control signals, and the uncontrolled CPs always provide charges to the node. The foregoing control signals are respectively generated by the corresponding control units, and the control units are coupled to the node and respectively output control signals according to the node voltage detected at the node. The higher the node voltage is, the more the controlled CPs controlled by the control signals not providing charges to the node are. Moreover, the output unit outputs an output voltage to an output node according to the node voltage at the node. The feedback unit has an input terminal and an output terminal, wherein the input terminal receives the output voltage and the output terminal sends out the output voltage which has been regulated through negative feedback.

In the present invention, some of the CPs are constantly enabled and some CPs are enabled according to the requirement, thus, the power consumption of the charge pump circuit is reduced and the extent of the output voltage drifting about the predetermined voltage is also reduced. Moreover, the output voltage of the charge pump circuit is controlled through negative feedback so that the drifting extent of the output voltage about the predetermined voltage is further reduced.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3:
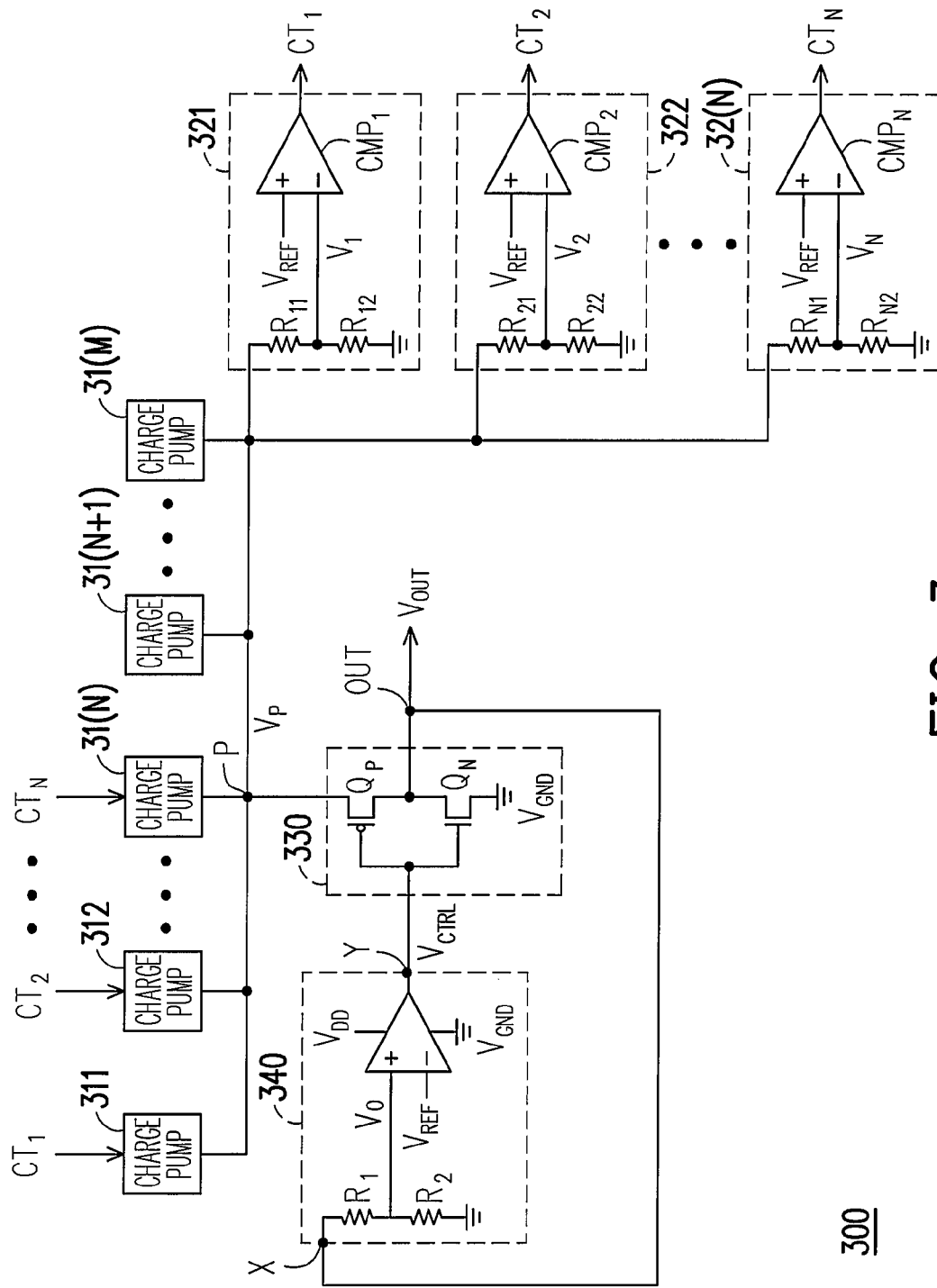
FIG. 3 is a block diagram of a charge pump circuit according to an embodiment of the present invention.

FIG. 3 is a block diagram of a charge pump circuit according to an embodiment of the present invention. Referring to FIG. 3, the charge pump circuit 300 includes M charge pumps (CPs) 311~31(M), wherein N CPs are controlled CPs 311~31(N) and (M-N) CPs are uncontrolled CPs 31(N+1)~31(M). In addition, the charge pump circuit 300 further includes N control units 321~32(N), an output unit 330 and a feedback unit 340. Here, it is assumed that the voltage pull-up capability of each of the CPs 311~31(M) is the same, that is, the charges (i.e. the current) provided per unit time by each of the CPs 311~31(M) is the same.

The foregoing M CPs 311~31(M) are all coupled to node P, wherein the controlled CPs 311~31(N) are respectively determined by the corresponding control signals $CT_1$~$CT_N$ whether to provide charges to node P, while the uncontrolled CPs 31(N+1)~31(M) respectively provide charges to node P constantly. The voltage pull-up capability of the CPs 311~31(M) is higher when the source voltage received by the CPs 311~31(M) is high voltage (for example, 3.6V) than the voltage pull-up capability thereof when the source voltage received is lower voltage (for example, 2.7V), thus, generally, it is designed that the total number of CPs (i.e. the value of M) is determined according to the number of CPs required for pulling up the voltage to the predetermined voltage level when the source voltage is lower voltage, and then the number of uncontrolled CPs (i.e. the value of (M-N)) is determined according to the number of CPs required for pulling up the voltage to the predetermined voltage level when the source voltage is high voltage.

The foregoing control units 321~32(N) are coupled to node P for detecting the node voltage $V_P$ at node P and outputting the control signals $CT_1$~$CT_N$ accordingly. The control signals $CT_1$~$CT_N$ respectively control the controlled CPs 311~31(N) to determine whether the controlled CPs 311~31(N) provide charges to node P. The control unit can be designed to include a voltage dividing circuit and a comparator, wherein the voltage dividing circuit receives the node voltage $V_P$ and generates a divided voltage, and then the comparator compares the divided voltage $V_P$ and a reference voltage to output a control signal for controlling the corresponding controlled CP. For the convenience of design, the reference voltage in each of the control units is designed to be the same voltage level, such as $V_{REF}$. Here, each of the control units can have the voltage level it can detect and can generate different control signal corresponding to the node voltage $V_P$ by only adjusting the voltage dividing circuit in each of the control units. In an embodiment, the voltage dividing circuit includes two resistors connected in series.

For example, the control unit 321 includes a voltage dividing circuit, which is composed of resistors $R_{11}$ and $R_{12}$, and a comparator $CMP_1$. If the reference voltage $V_{REF}$ thereof is 1.2V, the control signal $CT_1$ is "1" (i.e. logic 1) when the divided voltage $V_1$ is lower than 1.2V, so as to control the controlled CP 311 to provide charges to node P to pull up the node voltage $V_P$. Contrarily, the control signal $CT_1$ is "0" (i.e. logic 1) when the divided voltage $V_1$ is higher than 1.2V, so as to control the controlled CP 311 not to provide charges to node P.

Assuming that the predetermined voltage is 6.5V, because $V_1=V_P*R_{12}/(R_{11}+R_{12})$, the resistors $R_{11}$ and $R_{12}$ can be respectively adjusted to be 50 kΩ and 11.3 kΩ, accordingly, the control signal $CT_1$ is "1" when the node voltage $V_P$ is lower than 6.5V, and the control signal $CT_1$ is "0" when the node voltage $V_P$ is higher than 1.2V. Similarly, the resistors $R_{21}$ and $R_{22}$ of the control unit 322 are respectively adjusted to be 50 kΩ and 10.3 kΩ, so that the control signal $CT_1$ is "1" when the node voltage $V_P$ is lower than 7V, and the control signal $CT_1$ is "0" when the node voltage $V_P$ is higher than 7V. The other control units 323~32(N) can be inferred accordingly.

Accordingly, when the predetermined voltage is 6.5V and the voltage levels of the different control signals the control units 321~32(N) can detect and generate are 6.5V, 7V, 7.5V . . . , the control signals $CT_1$~$CT_N$ enable all CPs 311~31(N) to accelerate pulling up the node voltage $V_P$ when the node voltage $V_P$ is lower than 6.5V; the control signals $CT_1$~$CT_N$ only disable the CPs 311 when the node voltage $V_P$ is between 6.5V and 7V; and the control signals $CT_1$~$CT_N$ only disable the CPs 311 and 312 when the node voltage $V_P$ is between 7V and 7.5V; . . . . Through enabling some of the CPs 311~31(M) permanently and disabling some other of the CPs 311~31(M) accordingly, the extent of the node voltage $V_P$ drifting about the predetermined voltage when the node voltage $V_P$ is regulated at the predetermined voltage is reduced, and moreover, since some of the CPs are enabled according to the requirement, the power consumption of the circuit is reduced.

Next, to further stabilize the node voltage $V_P$ at the predetermined voltage, in the present invention, the output unit 330 is used along with the feedback unit 340 for negative feedback controlling and the power supply of the feedback unit 340 is $V_{DD}$, wherein the voltage level of the source voltage $V_{DD}$ has to be able to completely turn off the pull-up transistor $Q_P$. The output unit 330 includes a pull-up circuit $Q_P$ and a pull-down circuit $Q_N$ Wherein the pull-up circuit $Q_P$ is coupled between the node P and the output node OUT to lead charges at the node P to the output node OUT according to the feedback control voltage $V_{CTRL}$. The pull-down circuit $Q_N$ is coupled between the output node OUT and the ground node GND to lead charges at the output node OUT to the ground node GND according to the feedback control voltage $V_{CTRL}$.

In an embodiment, the pull-up circuit $Q_P$ is a PMOS (P-channel metal oxide semiconductor) pull-up transistor and the pull-down circuit $Q_N$ is an NMOS pull-down transistor. Wherein the first terminal (the source) of the pull-up transistor $_P$ is coupled to the node P, the second terminal (the drain) of the pull-up transistor $Q_P$ is coupled to the first terminal (the drain) of the pull-down transistor $Q_N$, the second terminal (the source) of the pull-down transistor $Q_N$ is coupled to the ground voltage GND, and the control terminals (the gates) of the pull-up transistor $Q_P$ and the pull-down transistor $Q_N$ are coupled to each other and receive the feedback control voltage $V_{CTRL}$.

In an embodiment, the feedback unit 340 includes a voltage dividing circuit, which has resistors $R_1$ and $R_2$, and a comparator CMP. Wherein the voltage dividing circuit having the resistors $R_1$ and $R_2$ receives the output voltage $V_{OUT}$ from the output node OUT and generates a divided voltage $V_0$, and then the comparator CMP compares the divided voltage $V_0$ and a reference voltage $V_{REF}$ and outputs the feedback control voltage $V_{CTRL}$. When the output voltage $V_{OUT}$ received by the input terminal X of the feedback unit 340 is large enough to make the divided voltage $V_0$ higher than the reference voltage $V_{REF}$, the feedback control voltage $V_{CTRL}$ output from the output terminal Y of the feedback unit 340 is "$V_{DD}$". Here, the pull-up transistor $Q_P$ is turned off and the pull-down transistor $Q_N$ is turned on, so as to lead charges at the output node OUT to the ground node GND, and further to pull down the output voltage $V_{OUT}$. Contrarily, when the output voltage $V_{OUT}$ received by the input terminal X of the feedback unit 340 is small enough to make the divided voltage $V_0$ lower than the reference voltage $V_{REF}$, the feedback control voltage $V_{CTRL}$ output from the output terminal Y of the feedback unit 340 is "VGND". Here, the pull-up transistor $Q_P$ is turned on and the pull-down transistor $Q_N$ is turned off, so as to lead charges at the node P to the output node OUT, and further to pull up the output voltage $V_{OU}$.

Figures 1, 2:
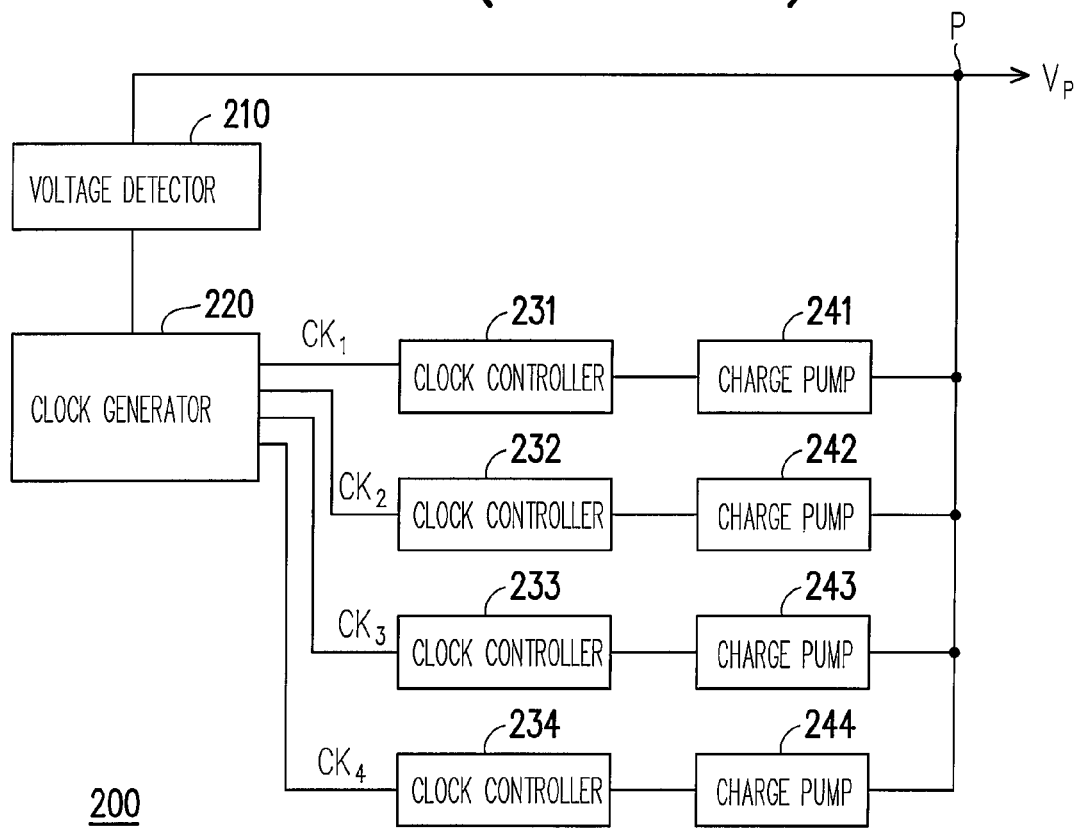
FIG. 1 illustrates the canonical values of biases required by a memory cell of a flash memory at reading, writing (or programming), and erasing.
FIG. 2 is a block diagram of a conventional charge pump circuit.
Figure 4:
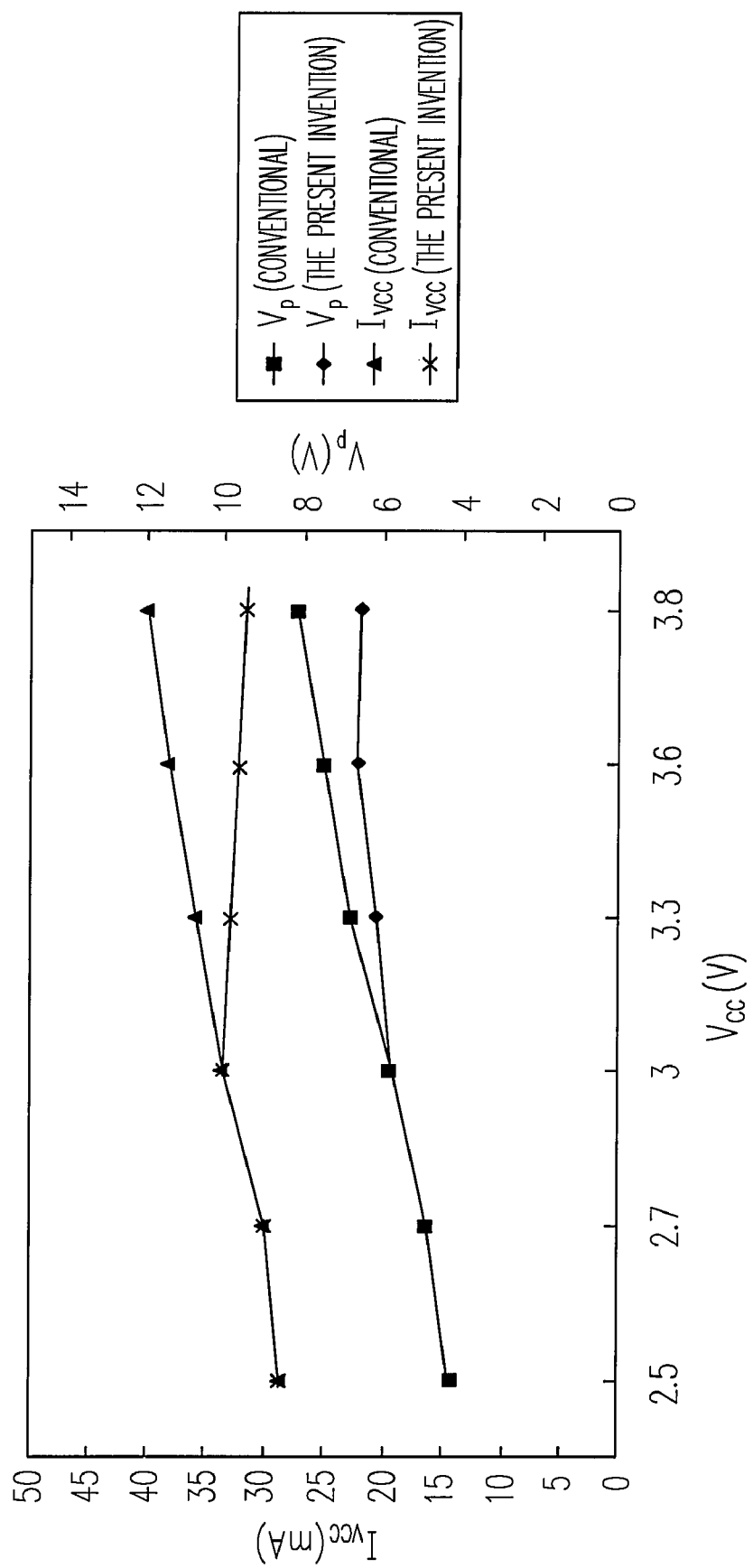
FIG. 4 is a simulative diagram of the conventional charge pump circuit and the charge pump circuit 300 in FIG. 3.

FIG. 4 is a simulative diagram of the conventional charge pump circuit and the charge pump circuit 300 in FIG. 3, wherein the present invention is simulated by the charge pump circuit 300 in FIG. 3 while the conventional charge pump circuit is simulated by the charge pump circuit 300 in FIG. 3 minus the control units 321~32(N) and the controlled CPs 311~31(N), which is similar to the charge pump circuit 200 in FIG. 2. Referring to FIG. 4, the abscissa is the source voltage Vcc received by the CPs, the ordinate at left is the total source current Ivcc received by the CPs, and the ordinate at right is the node voltage $V_P$ ($V_P$ is an output voltage to the conventional charge pump circuit; but to the charge pump circuit in the present invention, $V_P$ is a node voltage related to the output voltage) of node P in FIG. 3. It can be noted from FIG. 4 that when the source voltage Vcc is higher than 3V, the charge pump circuit 300 of the present invention in FIG. 3 has obviously less total source current Ivcc than the conventional charge pump circuit 200 in FIG. 2, so that the power consumption thereof is less.

In overview, according to the present invention, through enabling some CPs permanently and some other CPs according to the requirement, the power consumption of the charge pump circuit and the extent of the output voltage drifting about the predetermined voltage are reduced. Moreover, the output voltage of the charge pump circuit is further controlled through negative feedback, so that the extent of the voltage drifting about the predetermined voltage is further reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A charge pump circuit, comprising:
    a plurality of controlled charge pumps, determining whether to provide charges to a node by a plurality of control signals;
    a plurality of uncontrolled charge pumps, respectively providing charges to the node constantly;
    a plurality of control units, coupled to the node, detecting a node voltage at the node, respectively outputting the control signals according to the node voltage;
    an output unit, coupled to the node, outputting an output voltage to an output node according to the node voltage; and
    a feedback unit, having an input terminal for receiving the output voltage and an output terminal for sending out the output voltage regulated through negative feedback;
    wherein the higher the node voltage is, the more the controlled charge pumps controlled by the control signals not providing charges to the node are.

2. The charge pump circuit as claimed in claim 1, wherein each of the control units comprises:
    a voltage dividing circuit, receiving the node voltage and generating a divided voltage; and
    a comparator, comparing the divided voltage and a reference voltage and outputting the corresponding control signal.

3. The charge pump circuit as claimed in claim 1, wherein the feedback unit comprises:
    a voltage dividing circuit, receiving the output voltage and generating a divided voltage; and
    a comparator, comparing the divided voltage and a reference voltage and outputting a feedback control voltage.

4. The charge pump circuit as claimed in claim 3, wherein the output unit comprises:
    a pull-up circuit, coupled between the node and the output node, leading the charges at the node to the output node according to the feedback control voltage; and
    a pull-down circuit, coupled between the output node and a ground node, leading the charges at the output node to the ground node according to the feedback control voltage.

5. The charge pump circuit as claimed in claim 4, wherein the pull-up circuit comprises a pull-up transistor and the pull-down circuit comprises a pull-down transistor, wherein the first terminal of the pull-up transistor is coupled to the node, the second terminal of the pull-up transistor is coupled to the first terminal of the pull-down transistor, the second terminal of the pull-down transistor is coupled to the ground voltage, and the control terminals of the pull-up transistor and the pull-down transistor are coupled to each other and receive the feedback control voltage.

6. The charge pump circuit as claimed in claim 5, wherein the pull-up transistor is a PMOS transistor and the pull-down transistor is an NMOS transistor.

7. A semiconductor memory device, comprising a charge pump circuit having:
    a plurality of controlled charge pumps, determining whether to provide charges to a node by a plurality of control signals;
    a plurality of uncontrolled charge pumps, respectively providing charges to the node constantly;
    a plurality of control units, coupled to the node, detecting a node voltage at the node, respectively outputting the control signals according to the node voltage;
    an output unit, coupled to the node, outputting an output voltage to an output node according to the node voltage; and
    a feedback unit, having an input terminal for receiving the output voltage and an output terminal for sending out the output voltage regulated through negative feedback;
    wherein the higher the node voltage is, the more the controlled charge pumps controlled by the control signals not providing chargers to the node are.

* * * * *